(12) United States Patent
Cesano

(10) Patent No.: US 7,241,412 B2
(45) Date of Patent: Jul. 10, 2007

(54) METHOD FOR PRODUCING A PANEL OF PLASTICS MATERIAL

(75) Inventor: Franco Cesano, S.Secondo di Pinerolo (IT)

(73) Assignee: CRS SRL Centro Richerche E Sperimentazioni, Frossasco (Turin) (IT)

( * ) Notice: Subject to any disclaimer, the term of this patent is extended or adjusted under 35 U.S.C. 154(b) by 353 days.

(21) Appl. No.: 10/628,482

(22) Filed: Jul. 29, 2003

(65) Prior Publication Data

US 2005/0023725 A1    Feb. 3, 2005

(51) Int. Cl.
*B29C 43/18* (2006.01)
*B29C 43/20* (2006.01)
*B29C 45/16* (2006.01)

(52) U.S. Cl. .................. 264/250; 264/266; 264/278
(58) Field of Classification Search ............. 264/250, 264/255, 266, 320, 322
See application file for complete search history.

(56) References Cited

U.S. PATENT DOCUMENTS 6,027,678 A * 2/2000 Rehm et al. ............... 264/255
6,838,027 B2 * 1/2005 Brodi et al. ............... 264/138

* cited by examiner

*Primary Examiner*—Edmund H. Lee
(74) *Attorney, Agent, or Firm*—Sughrue Mion, PLLC

(57) ABSTRACT

A method for producing a panel comprising at least one region (16) of compression moulded thermoplastic or thermosetting material and at least one region (14) of injection moulded thermoplastic material, comprising the step of placing at least one plate of thermoplastic or thermosetting material in a plastic state between two half-moulds (26, 28) having respective moulding surfaces (30, 32), closing the half-moulds (26, 28) and compressing the plate (16) between two mutually facing compression moulding regions (30*a*, 32*a*) of said moulding surfaces (30, 32). The method comprises the step of injecting thermoplastic material into a space defined between two mutually facing injection moulding regions (30*b*, 32*b*) of said moulding surfaces (30, 32).

4 Claims, 3 Drawing Sheets

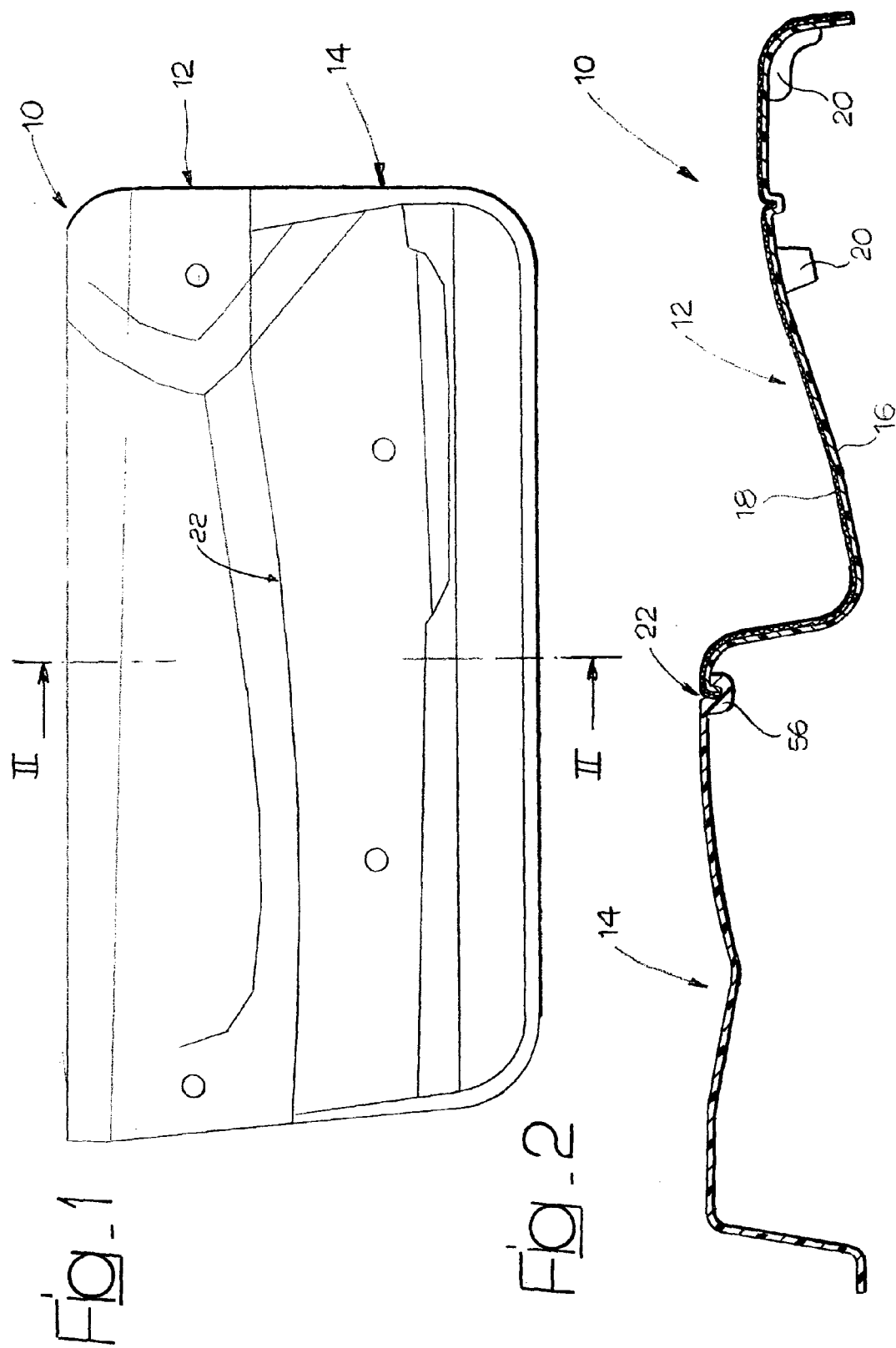

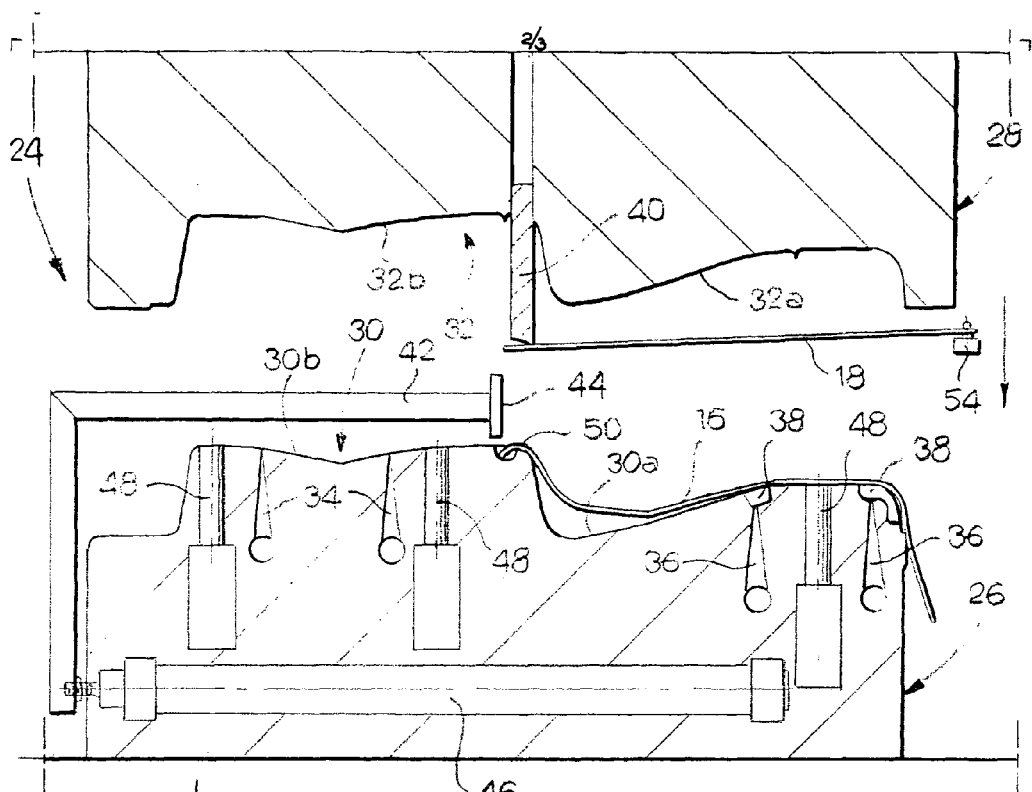
Fig_3
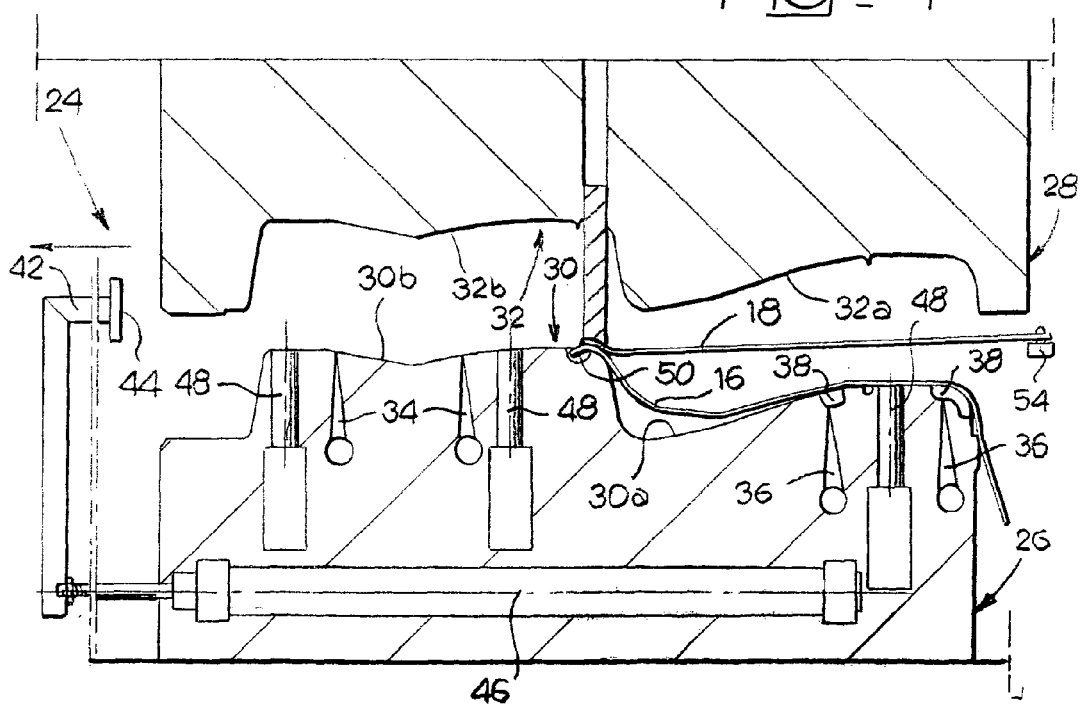
Fig_4

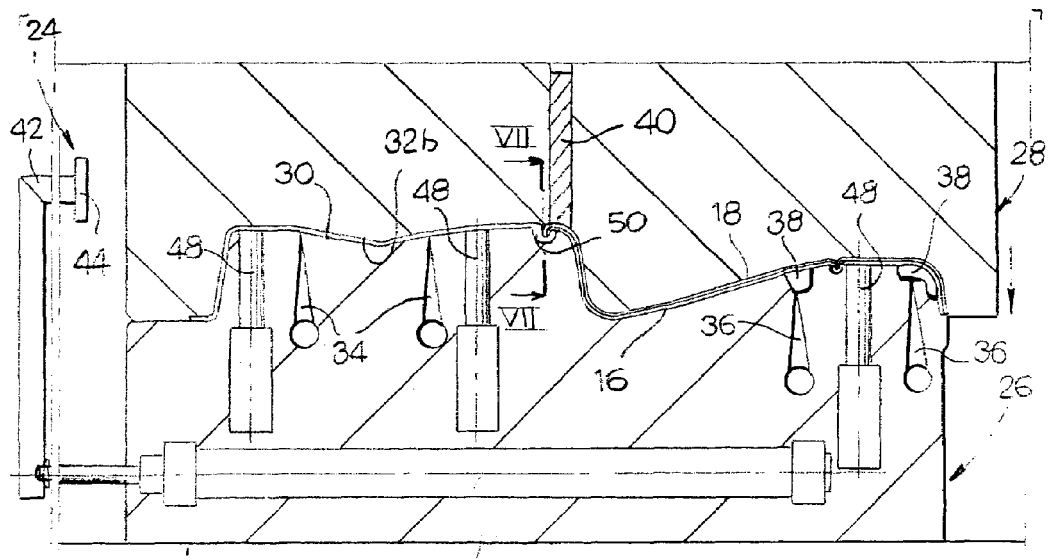
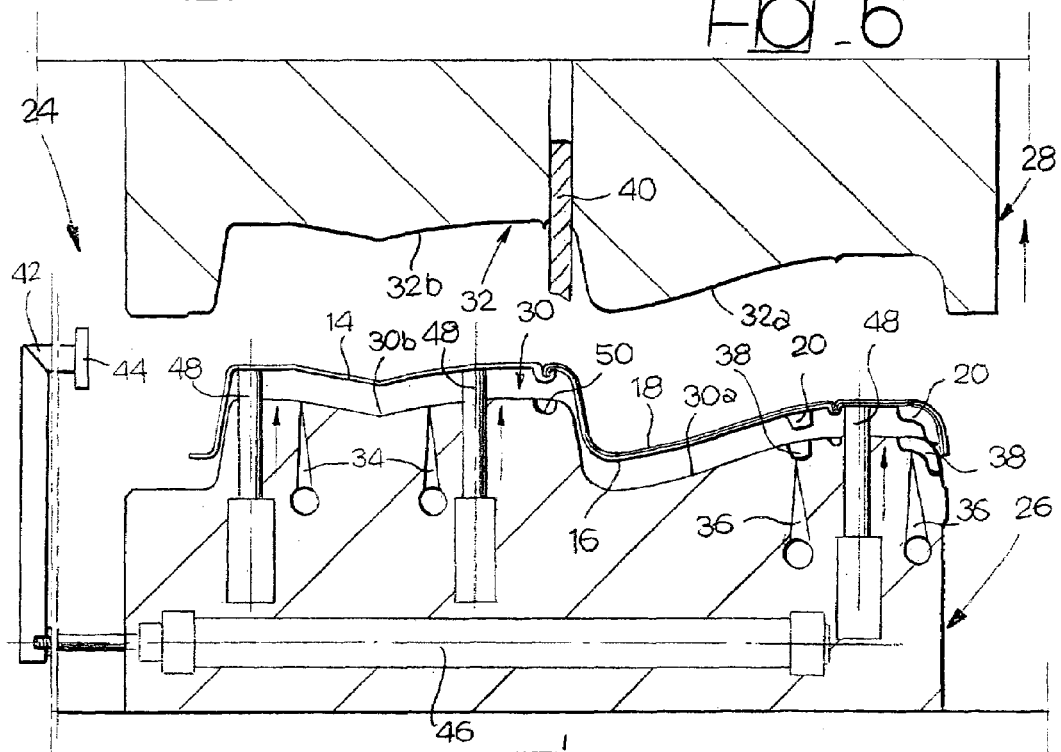
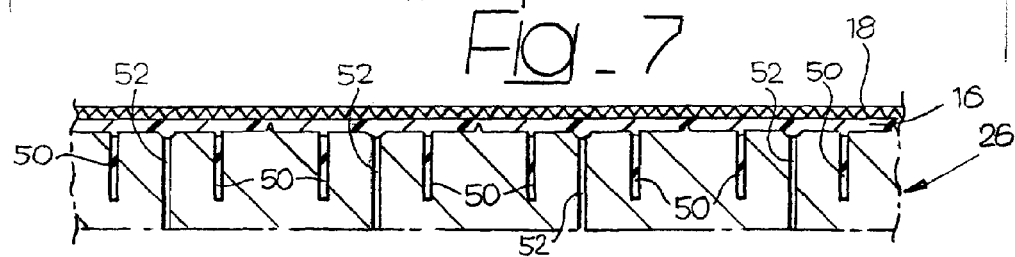

METHOD FOR PRODUCING A PANEL OF PLASTICS MATERIAL

BACKGROUND OF TILE INVENTION

The present invention relates to a method and an apparatus for producing a panel of plastic material. The invention was developed in particular for the production of panels having at least a first region formed by at least one plate of thermoplastic or thermosetting material, possibly coated, moulded by thermo-compression and at least one second region constituted by injection moulded thermoplastic material. Panels of this kind are used in particular as inner covering panels for vehicle doors, in which the panel region constituted by the coated plate of thermoplastic material is aesthetically more valuable and is used for the upper part of the panel, whilst the injection moulded part made of thermoplastic material, which is less delicate, extends on the lower part of the panel, more prone to be hit by the feet of the persons stepping into and out of the vehicle.

Currently used solutions for the production of panels of this kind require the use of two independent moulding apparatuses, one for thermo-compression moulding of the coated plates of thermoplastic material and the other for the production by means of injection moulding of the complementary panel region. The two panel parts are mutually joined in a subsequent step by means of mechanical anchoring, ultrasonic welding or other fastening method.

European Patent Application No. 1153725 by the same Applicant describes a method and an apparatus for forming, by injection moulding, a component anchored onto a surface of a plate of thermoplastic material whilst said plate is moulded by thermo-compression between the mutually opposite surfaces of two half-moulds. According to the method and the apparatus described therein, an injection moulding cavity is obtained in one of the half-shells and terminates on the thermo-compression moulding surface of the same half-shell.

SUMMARY OF THE INVENTION

The present invention has the object of providing a method and an apparatus which allow to obtain, in a simpler and more rapid manner, panels constituted by two complementary regions, made up one by a plate of thermoplastic material and the other one by injection moulded material.

According to the present invention, said object is achieved by a method and by an apparatus having the characteristics set out in the claims.

BRIEF DESCRIPTION OF THE DRAWINGS

The present invention will now be described in detail with reference to the accompanying drawings, provided purely by way of non limiting example in which:

FIG. 1 is a schematic front view of an interior lining panel for vehicle doors obtained by means of a method and an apparatus according to the present invention, FIG. 2 is a section according to the line II—II of FIG. 1, FIGS. 3 through 6 are schematic sections showing the steps for producing the panel of FIG. 1, and FIG. 7 is a section in enlarged scale according to the line VII—VII of FIG. 5.

DETAILED DESCRIPTION OF THE INVENTION

With reference to FIGS. 1 and 2, the reference number 10 designates an inner lining panel for vehicles comprising a first region 12 and a second region 14 complementary to the first region 12. The first region 12 is formed by a plate 16 of thermoplastic material moulded by thermo-compression and provided with an aesthetic lining 18 applied onto the visible surface during the moulding step. The plate of thermoplastic material can be provided with inserts 20 made of injection moulded plastic material formed during the thermo-compression moulding of the plate 16, as described in detail in the document EP-A-1153725 by the same Applicant. The second region 14 of the panel 10 is obtained by injection of plastic material in the manner described below. The second region 14 is permanently fastened to the first region 12 along a junction area 22 which extends on the front face and on the rear face of the panel 10 along the entire longitudinal edge shared by the two regions 12, 14. The panel 10 including thermo-compression moulded plate 16 with the related lining 12 and the injection-moulded region 14 is obtained with a single thermo-compression-injection moulding operation, in the manner described below.

With reference to FIGS. 3 through 6, the reference number 24 designates an apparatus according to the present invention for producing the panel 10. The apparatus 24 comprises a lower half-mould 26 and an upper half-mould 28, movable relative to one another between an open position and a closed position. The half-moulds 26, 28 have respective mutually co-operating moulding surfaces 30, 32. Each of the moulding surfaces 30, 32 is subdivided into a thermo-compression moulding region 30a, 32a and into an injection moulding region 30b, 32b, mutually complementary. The half-moulds 26, 28 are provided with conventional cooling means (not shown). In one or in both the half-moulds 26, 28 is formed at least one injection channel which terminates on the injection moulding region 30b, 32b of the respective half-mould. In the example illustrated in the drawing, two injection channels 34 formed in the lower half-mould 26 are schematically represented. The figures also illustrate auxiliary injection channels 26 which communicate with injection moulding seats 38 that terminate on the thermo-compression moulding region 30a, to form by means of injection moulding the inserts 20 on the rear face of the plate of thermoplastic material 16, as described in the aforementioned document EP-A-1153725.

The upper half-mould 28 is preferably provided with a retaining element 40 able to slide relative to the upper half-mould 28 between an extracted position and a rearward position along a direction parallel to the direction of closure of the half-moulds. The retaining element 40 is destined to hold an edge of the plate of thermoplastic material 16 and of the lining 18 in correspondence with the junction line between the thermo-compression and injection moulding areas. Multiple retaining elements 40 can be provided, distributed along said junction line, or a single retaining element 40 can be provided, extending along all or a substantial part of the length of the border line between the compression moulding regions and the injection moulding regions.

The lower half-mould 26 is preferably provided with a positioning element 42 having a positioning surface 44. The positioning element 42 is preferably borne by an actuator 46 which allows to displace the positioning element 42 between an operative position shown in FIG. 3 and an inoperative position shown in FIGS. 4, 5 and 6. In the operative position, the positioning surface 44 extends in correspondence with the border line between the thermo-compression moulding region 30a and the injection moulding region 30b. Alternatively, the positioning surface 44 can be mounted able to slide in the vertical direction in the lower half-mould 26.

The lower half-mould 26 is preferably provided with a plurality of extractor elements 48 movable between an inoperative position shown in FIGS. 3, 4 and 5 and the operative position shown in FIG. 6.

With reference to FIG. 7, the lower half-mould 26 is provided with a plurality of grooves 50 which terminate on the moulding surface 30 and extend astride the compression moulding region 30a and the injection moulding region 30b. Moreover, in the lower half-mould 26 can be provided suction channels 52 which terminate on the surface 30 along the border line between the thermo-compression moulding region 30a and the injection moulding region 30b.

The operation of the apparatus described above is as follows. With reference initially to FIG. 3, at least a plate of thermoplastic or thermosetting material 16 in a plastic state is laid onto the thermo-compression moulding region 30a of the lower half-mould 26. In this step, the upper half-mould 28 is in a raised position and it bears a frame 54 whereon is stretched a sheet of lining fabric 18. The positioning element 42 is in the operative position, in which the surface 44 extends along the border line between the moulding regions 30a and 30b. The positioning surface 44 serves as a reference to lay the plate 16 onto the region 30a automatically, so that after the laying an edge of the plate 16 extends along the border line between the moulding regions 30a and 30b. The suction channels 52 are connected to a suction source and hold the edge of the plate 16 along the aforesaid border line. The retaining element 40 is in its lowered position and an edge of the lining sheet 18 extends below the retaining element 40.

In the subsequent step shown in FIG. 4, the positioning element 42 is brought to its inoperative position outside the half-moulds or inside the lower half-mould 26 and the upper half-mould 28 is lowered. FIG. 4 shows the moment in which the retaining element 40 presses the edge of the lining edge 18 against the edge of the plate 16. The upper half-mould 28 continues to be lowered down to the completely closed position shown in FIG. 5. In this condition, the thermo-compression moulding regions 30a and 32a carry out the thermo-compression moulding of the plate 16 and simultaneously apply the lining sheet 18 against the upper surface of the plate 16. As can be seen in FIG. 5, in the closed configuration of the half-moulds 26, 28, the injection moulding regions 30b and 32b facing each other define an injection moulding cavity which communicates with an end of the plate 16. In the closed condition of the half-moulds 26, 28 plastic material is injected into the injection moulding cavity defined between the injection moulding regions 30b and 32b. The injected plastic material fills the cavity and solidifies in contact with the regions 30b and 32b. The injected plastic material also penetrates into the grooves 50 which extend astride the border line between the compression moulding and injection moulding regions and forms a series of mutually parallel ribs, one of which is designated as 56 in FIG. 2, which merge on the lower surface of the plate of thermoplastic material 16 achieving a secure bond between the plate 16 and the panel region 14 obtained by injection moulding. Simultaneously with the injection of plastic material between the injection moulding surfaces 30b and 32b, plastic material is injected into the seats 38 via the auxiliary injection channels 36 to form the inserts 20 on the lower surface of the plate 16. Once the injected plastic material is solidified and the plate 16 is hardened, the upper half-mould 28 is raised and the extractors 48 are activated to detached the finished panel from the surface 30.

What is claimed is:

1. A method for producing a panel comprising at least one first region of compression-moulded thermoplastic or thermosetting material and a second region of injection-moulded thermoplastic material, comprising the steps of:
   providing a first and a second half-mould relatively movable along a vertical direction between an open position and a closed position, the half moulds having respective moulding surfaces having respective compression moulding regions and injection moulding regions facing each other;
   providing between said first and second half moulds a positioning element movable between an operative position and an inoperative position, said positioning element having a positioning surface which in said operative position extends along a border line between said compression moulding and injection moulding regions;
   providing a retaining element borne by one of said half-moulds and vertically movable with respect to the respective half-mould between an extracted and a retracted position, said retaining element having a retaining surface extending along said border line;
   positioning at least one plate of thermoplastic or thermosetting material in a plastic state between the compression moulding regions of said half-moulds, with an edge of said plate abutting said positioning surface of said positioning element when the positioning element is in its operative position;
   retaining said edge of said plate along said border line by pressing said retaining surface of said retaining element in the extracted position against said edge during the closure of said half-moulds;
   compressing the plate between said mutually facing compression-moulding regions of said moulding surfaces; and
   injecting plastic material between said two mutually facing injection moulding regions of said moulding surfaces when the half-moulds are in the closed position to produce said panel.

2. A method as claimed in claim 1, further comprising the steps of:
   providing a lining sheet positioned between the compression moulding surfaces of said half moulds when the half-mould are in the open position; and
   applying said lining sheet onto a surface of said plate by closing the half-moulds.

3. A method as claimed in claim 2, further comprising the step of pressing an edge of said lining sheet against said edge of said plate by means of said retaining element during the closure of the half-moulds.

4. A method as claimed in claim 1, further comprising the step of providing in one of said half-moulds a plurality of grooves which extend astride said border line between the compression moulding region and the injection moulding region of the respective moulding surface and filling said grooves with injection moulded material during the injection of plastic material between said two mutually facing injection moulding regions.

* * * * *